United States Patent [19]

Michel et al.

[11] 4,130,683
[45] Dec. 19, 1978

[54] SPONGE-LIKE MATERIAL HAVING IMPROVED SCRUBBING AND CLEANING ABILITY

[75] Inventors: Wolfgang Michel, Wiesbaden; Heinz Kälberger, Oberwalluf, both of Germany

[73] Assignee: Hoechst Aktiengesellschaft, Frankfurt am Main, Germany

[21] Appl. No.: 886,818

[22] Filed: Mar. 15, 1978

[30] Foreign Application Priority Data

Mar. 17, 1977 [DE] Fed. Rep. of Germany ....... 2711698

[51] Int. Cl.² .............................................. B32B 3/02
[52] U.S. Cl. .................................. 428/194; 156/77; 156/306; 15/209 B; 428/195; 428/255; 428/306; 428/310; 428/327; 428/532
[58] Field of Search ................. 15/118, 209 R, 209 B, 15/209 C, 244 C; 428/195, 194, 255, 304, 306, 310, 311, 315, 327, 320, 532; 156/306, 77

[56] References Cited

U.S. PATENT DOCUMENTS

| 2,885,703 | 5/1959 | Elliott | 15/209 B |
| 3,080,688 | 3/1963 | Politzer | 428/320 |
| 3,629,896 | 12/1971 | Sirnec | 15/209 B |
| 3,634,183 | 1/1972 | Viola | 428/315 |
| 3,974,319 | 8/1976 | Alibeckoff | 15/209 R |
| 4,015,306 | 4/1977 | Fenster | 15/209 R |

Primary Examiner—W. J. Van Balen
Attorney, Agent, or Firm—Bacon & Thomas

[57] ABSTRACT

Disclosed is a porous sponge-like material having an improved scrubbing and cleaning ability which comprises a porous cellulose hydrate body having at least one netting attached to at least a portion of the surface of the body. In order to improve cleaning ability, the porous cellulose hydrate body contains a thermoplastic filler material. In the preferred embodiment, moreover, the filler material is comprised of a heat-sealable thermoplastic material and the netting at least partially comprised of a heat-sealable thermoplastic material to enable the facile bonding of the netting to the porous cellulose body by heat-sealing.

16 Claims, 1 Drawing Figure

U.S. Patent
Dec. 19, 1978
4,130,683
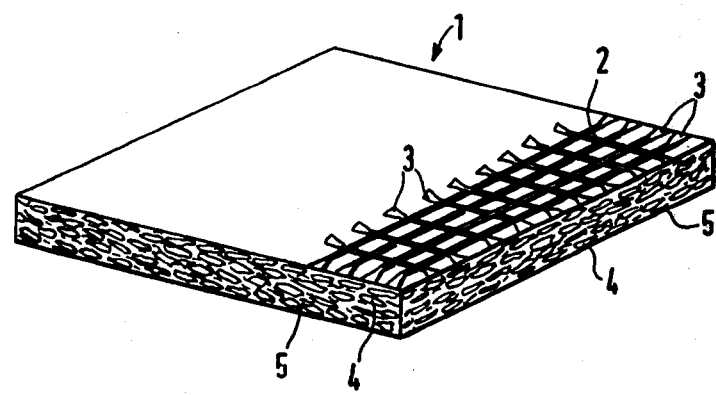

SPONGE-LIKE MATERIAL HAVING IMPROVED SCRUBBING AND CLEANING ABILITY

BACKGROUND OF THE INVENTION

The present invention relates to a porous shaped cellulose hydrate material with an improved scrubbing and cleaning effect, especially one in the form of a sponge cloth. Further, the invention relates to a process for the manufacture of the material and to its use as a cleaning device.

The manufacture of porous shaped cellulose hydrate materials is known. In a typical process for the preparation of this material, cellulose is first converted into viscose. Reinforcing fibers, e.g., cotton fibers of 12 to 15 mm length, or salt grains for the formation of pores, particularly crystals of Glauber's salt of appropriate grain size, may be incorporated in the viscose, if desired. The mass is then applied to an endless belt, and precipitated under the influence of heat by a coagulating agent, such as a water bath at approximately 100° C. In the water bath, a major portion of the salt is dissolved and washed away. The resulting porous shaped material then passes through a precipitating bath containing aqueous sulfuric acid and, optionally, through a chlorite bleaching bath. A washing step follows next wherein the porous shaped material is thoroughly washed with water. After drying, it is cut to the desired size. Colored materials may be produced by the addition of dyes and color brighteners into the viscose mixture.

Known porous shaped cellulose hydrate materials, especially in the form of sheet-like, rectangular bodies, such as sponge cloths and floorcloths, serve for cleaning soiled surfaces by absorbing or adsorbing liquids, dust, and coarse dirt particles. There is, however, the risk that the porous material, especially a sponge cloth, may glide over the dirt and leave oily, streaky or smudgy traces instead of removing them. Moreover, the use of these cloths has the disadvantage that firmly adhering dirt, e.g., on the windows and lacquered surfaces of cars, can be removed only with considerable effort.

It has already been suggested, in German Offenlegungsschrift No. 15 03 860, to introduce a framework consisting of a porous netting of a hydrophobic organic polymer into a viscose web and then convert the viscose into a porous shaped cellulose hydrate material. The surface of this cleaning device, however, is not sufficiently rough to remove obstinate dirt. Further, the whole of its surface being covered by the netting, the cleaning effect of the porous shaped material is strongly limited, because it is no longer capable of directly contacting the surface to be cleaned.

SUMMARY OF THE INVENTION

Accordingly, it is an object of the instant invention to provide a porous cellulose hydrate material which has improved scrubbing and cleaning ability.

It is an additional object of the present invention to provide a porous cellulose hydrate material of the type having a netting bonded to at least a portion of the surface of the cellulose hydrate material which has improved scrubbing and cleaning ability, particularly for greasy, oily dirt.

In accomplishing the foregoing and other objects, there has been provided in accordance with the present invention a porous sponge-like material having an improved scrubbing and cleaning ability which comprises a porous cellulose hydrate body having at least one netting attached to at least a portion of the surface of the body, the porous cellulose hydrate body containing a thermoplastic filler material selected from the group consisting of thermoplastic fibers, fibrids, or powders on at least that portion of the body in contact with the netting, in order to further enhance the cleaning ability of the material.

In the preferred embodiment, the porous material of the instant invention preferably contains at least 3% by weight of the thermoplastic filler material. Moreover, the porous material is preferably formed with a sheet-like rectangular shape. The porous cellulose body may also have a plurality of different nettings of different structure and/or materials attached thereto in order to provide the porous material with a plurality of different scrubbing effects. A further advantage is accrued by selecting the thermoplastic filler material to be of a heat-sealable thermoplastic, and the netting to be at least partially of a heat-sealable thermoplastic. This provision enables the netting to be quickly and easily bonded to the porous cellulose body through heat-sealing, thereby considerably simplifying the manufacturing process. Of course, it is also contemplated that the netting and filler material may be of a wide variety of materials, and the netting can be attached to the porous cellulose body by any method well known to those skilled in the art.

Also provided in accordance with the present invention is a process for the manufacture of the porous material of the instant invention. This process comprises preparing a viscose mixture containing a pore forming agent and the thermoplastic filler material; forming the viscose mixture into the porous cellulose hydrate body; and then bonding at least one netting to at least a portion of the surface of the body. In the preferred embodiment, as mentioned supra, the filler material is comprised of a heat-sealable thermoplastic, and the netting at least partially comprised of a heat-sealable thermoplastic to allow the netting to be quickly and easily bonded to the cellulose body by heat-sealing. In order to improve its mechanical strength and cleaning ability, the porous cellulose hydrate body may also be thermally treated under pressure.

Other objects, features, and advantages of the instant invention will become apparent to the skilled artisan upon examination of the following detailed description of the present invention, taken in conjunction with the accompanying FIGURE of drawing.

BRIEF DESCRIPTION OF THE DRAWING

The attached FIGURE is a perspective view of the porous sponge-like material of the present invention.

DETAILED DESCRIPTION OF THE PREFERRED EMBODIMENT

It is an object of the present invention to improve the known porous sponge-like materials in order to eliminate the foregoing disadvantages and to provide a porous material which is capable of removing tenacious or greasy, oily dirt.

In accordance with the present invention, this object is achieved through the provision of a porous shaped cellulose hydrate material which carries a netting on at least one of its surfaces. The sponge-like material according to the instant invention is characterized in that at least part of its surface is combined with at least one netting, and that it contains a thermoplastic filler material selected from the group consisting of thermoplastic fibers, fibrids, or powders at least on the surface combined with the netting.

The term "porous shaped material", as used in connection with the present invention, particularly means bodies of sponge-like structure, such as sheet-like rectangular sponge-cloths, or sponges and the like of other shapes. The shaped cellulose hydrate body is formed by known methods, such as, for example, by compression and/or cutting from a cellulose hydrate web. It may also be in a special shape to fit a particular purpose.

The cellulose hydrate web may be produced by the conventional process described above. In accordance with the instant invention, however, powders, fibers, and/or fibrids of a weldable or heat-sealable synthetic organic material, such as, for example, homopolymers or copolymers of olefins, such as ethylene or propylene, polyvinyl chloride, and/or polystyrene and its polymers and copolymers, preferably polyamides, are incorporated into the viscose, for example, by kneading or stirring, a minimum quantity of 3 to 5% by weight, based on the weight of the porous shaped material, being required. Subsequently, the viscose is coagulated in the normal manner. Preferably, however, the plastic filler material will comprise from about 3 to about 40% by weight of the viscose, at most, preferably from about 10 to about 40% by weight. A proportion of more than 40% by weight is not necessary and, moreover, leads to a gradual reduction of the mechanical strength of the porous shaped material. A proportion of 80% by weight must be regarded as the upper limit. The powder particles may have a size of about 1 $\mu$m, preferably from about 20 $\mu$m to about 2 mm, and fibers and fibrids may have an average length of from about 50 $\mu$m to about 15 mm, the length of the fibers preferably being from 10 to 15 mm and the length of the fibrids preferably being from 1 to 3 mm. The fibrids to be used according to the invention are the compounds known under the designation "synthetic wood pulp". These fibrids comprise fibrous material of synthetic organic polymers which normally contain from 0.05 to 3% by weight, preferably from 0.1 to 1% by weight, of a surface-active, hydrophilic organic compound, preferably one of high molecular weight. Starch, methyl cellulose, carboxy methyl cellulose, polyalkylene oxides, or polyvinyl alcohol are mentioned as examples. Polyvinyl alcohols with a degree of saponification of from 60 to 99.9% and a viscosity (4% solution in water of 20° C.) of between 4 and 90 cP are particularly suitable.

Various processes for the preparation of the polyolefin fibrids are known in the art, e.g. spraying of a superheated polymer solution, or of a superheated emulsion of a polyolefin solution and an aqueous solution of a surface-active, hydrophilic compound through an appropriate nozzle. The particularly preferred pololefin fibrids are obtained by flash evaporation of a superheated emulsion comprising a solution of a polyolefin in a low molecular weight hydrocarbon and an aqueous solution of a surface-active hydrophilic compound. The process may be conducted according to the method described in the German Offenlegungsschrift No. 24 11 589, the disclosure of which is hereby incorporated by reference, e.g. in the following manner:

A 250 l tank provided with a stirrer and an outlet valve which is connected by means of a pipe to a nozzle leading into a flash chamber, is filled with 9.6 kg of polyethylene (RSV 1.4 dl/g, MFI+ 5.58), 120 l of water, 96 g of polyvinyl alcohol (viscosity of a 4% solution in water at 20° C.: 4.6 to 6 cP; saponification degree: 98.5 to 100% (mol.)) and 120 l of hexane. The tank is then closed and its contents is heated to 150° C. while stirring, and maintained at this temperature for about 2½ hours.

+(MFI (melt flow index) 190/2 according to ASTM D 1238-62T=5.58)

The pressure rises to 12.3 kg/cm². After the polyethylene has dissolved and the contents of the tank have changed into an emulsion, the outlet valve is opened and the emulsion is allowed to pass over into the flash chamber at the rate at which a vacuum pump connected with the flash chamber can suck off the released vapors and maintain a pressure of about 200 mm Hg. The fibrids thus obtained are moistened with water to form a paste, passed seven times through a disc refiner, and then freed from water by centrifuging. The resulting fibrids have a specific surface, according to the BET method, of 8.2 m²/g and a classified length, according to TAPPI standard T 233 SU 64, of 0.9 mm.

Alternatively, suitable polyolefin fibrids may be produced according to the process described in German Offenlegungsschrift No. 22 49 604, the disclosure of which is hereby incorporated by reference. Prior to the flash evaporation of the polymer mixture, fillers or pigments, e.g. alumina, calcium carbonate, dolomite, or titanium dioxide may be added to the fibrids. Hydrophobized fillers or pigments are preferred. Suitable hydrophobizing agents are e.g., fatty acids, fatty acid amines or amides, and silicones.

The netting or nettings may be comprised of any material well known in the art such as, for example, metal wires, filaments or strands, but a latticed fabric of a synthetic organic material, preferably one of the polymers suggested above for the thermoplastic filler material, in particular polyamides or polyethylene, is preferred.

Normally, tne netting employed in the instant invention is sufficiently firmly attached to the surface of the porous shaped cellulose hydrate body if an area of a width of a few millimeters along its periphery is glued, clamped, sewn, cemented, sealed and/or welded to the porous shaped material.

It is not necessary for the netting to be applied to the entire surface of the porous shaped body; this would even have the drawback of reducing the effective cleaning surface of the porous material. Therefore, it is also suggested to fasten the netting to the porous shaped material by seams in the form of strips, grids, or dots.

Due to its roughness, the netting employed in the instant invention provides a considerable improvement in scrubbing ability, whereas the incorporated powder, fibers and/or fibrids, in particular, those consisting of a weldable or sealable synthetic organic material, have the advantage, in addition to providing a simple and quick means of attaching the netting by heat-sealing or welding, that the formation of oily streaks during wiping of soiled surfaces is reduced or altogether prevented. If it is this cleaning effect which is desired in the first place, a minimum quantity of 10% by weight of the thermoplastic filler material, based on the weight of the porous shaped material, is required.

The thermoplastic powder, fibers, and/or fibrids have the further advantage that they are capable of replacing at least part of the reinforcing fibers, e.g., cotton fibers.

The netting may be welded or sealed to the cellulose hydrate body by any means well known to the art; for this method, it is necessary for the netting to consist at least partially of a weldable or heat-sealable material, or to be at least partially coated with such a material. If a glue or an adhesive is used for bonding the netting to the porous shaped material, it must be water-proof. If the netting is fastened by sewing, the effective surface of the porous shaped material is barely reduced.

A netting with a suitable roughness preferably consists of an elastic latticed fabric set, e.g., to about 7/7 filaments of 0.3 mm diameter per centimeter and a mesh width of 1.5 mm up to a setting of 25/25 filaments of 0.15 mm diameter per centimeter and a mesh width of 0.25 mm. Latticed fabrics with a width of mesh below 0.25 mm may be used in cases where a relatively slight roughness is desired. On the other hand, if the mesh width exceeds 1.5 mm, almost no further increase of the roughness is observed.

The term "latticed fabric" as used in the instant invention means in particular an open-meshed, flexible grid woven from soft filaments which form both warp and woof of the fabric, the preferred material being a weldable or heat-sealable organic synthetic material. On the other hand, it is sufficient if the netting consists at least partially of weldable or sealable material or is coated on at least part of its surface with a heat-sealable layer.

As used herein, the term "netting" also includes flexible plastic films with a plurality of holes therein, an improved roughness being in particular produced by corrugations, grooves, or knubs, or by any other means of profiling the film surface. The holes in the film and the profiling of its surface are produced by known methods, e.g., by punching out or by embossing.

Alternatively, the netting may be a felt-like or fleece-like structure interrupted by a plurality of holes.

It is also possible to fasten nettings of different structure and/or of different materials to the surface of the porous shaped material or to different surfaces thereof. In this manner, the porous shaped material is provided with a number of areas of different degrees of roughness which display different scrubbing effects.

The shape, number, and arrangement of the above-mentioned holes are advantageously so selected that at least 30% of the surface of the porous shaped material covered by the film, the fleece, or the felt remain free and thus can get into direct contact with the surface to be cleaned. Preferably, the holes are arranged in a sieve-like manner.

In order to further improve its mechanical and cleaning properties, the porous shaped material according to the present invention may optionally be smoothed, embossed, or deformed by a thermal treatment under pressure, either before or after it has been attached to the netting. For this purpose, heated rollers with appropriately shaped surfaces may be used, for example. By this treatment, the mechanical properties of the shaped material, such as its tearing strength and penetration strength, are consolidated and improved.

An additional improvement in the scrubbing ability may be provided by anchoring plastic particles of 0.1 to 2 mm diameter to the surface of the porous shaped material. Through this provision, a certain degree of roughness is imparted to the surface, especially if the particles are attached by a thermal sintering process. Preferably, the particles comprise the same material as the thermoplastic filler material incorporated in the cellulose hydrate body.

By combining these plastic particles with nettings of different structures and/or materials, a porous sponge-like material is produced which has a number of areas with different degrees of roughness and scrubbing ability.

Referring to the attached FIGURE, the porous material of the instant invention is illustrated in the form of a sponge cloth 1 which is combined, by heat-sealing or welding, with a netting 2. Where the netting 2 is welded or sealed to the sponge cloth 1, the filaments of the netting show widened areas 3. The pores of the sponge cloth are designated with the numeral 4, and the fibers bear the number 5.

While the invention has now been described in terms of certain preferred embodiments and illustrated by numerous examples, the skilled artisan will appreciate that various modifications, substitutions, omissions, and changes may be made without departing from the spirit thereof. For example, the thermoplastic filler material employed in the present invention may, in addition to comprising thermoplastic resinous polymers, also comprise suitable naturally occuring thermoplastic resins, preferably those which are heat-sealable. Moreover, in addition to comprising powders, fibers, or fibrids, the filler material may comprise other discrete particulate matter such as rods, flakes, or filaments. As used herein, therefore, the term "filler material" refers to any of the particulate materials well known to the art. Accordingly, it is intended that the scope of the present invention be limited solely by the scope of the following claims.

What is claimed is:

1. A porous sponge-like material suitable for use in cleaning comprising a porous cellulose hydrate body having at least one netting attached to at least a portion of the surface thereof, said porous cellulose hydrate body containing a filler material of thermoplastic synthetic resinous particulate material selected from the group consisting of thermoplastic synthetic resinous powders, fibers, or fibrids on at least that portion of the surface of said body which is in contact with said netting.

2. The material of claim 1, wherein said thermoplastic filler material is a heat-sealable thermoplastic material, and said netting is at least partially comprised of a heat-sealable thermoplastic material.

3. The material of claim 2, wherein said material contains at least 3% by weight of said thermoplastic filler material.

4. The material of claim 3, wherein said material contains from about 3 to about 40% by weight of said thermplastic filler material.

5. The material of claim 3, wherein said material contains at least 10% by weight of said thermoplastic filler material.

6. The material of claim 5, wherein said material contains from about 10 to about 40% by weight of said thermoplastic filler material.

7. The material of claim 3, wherein said material has a sheet-like rectangular shape.

8. The material of claim 3, wherein said netting is bonded to said porous cellulose hydrate body by bonding of periphery of said netting to said body.

9. The material of claim 8, wherein said netting comprises a latticed fabric.

10. The material of claim 8, wherein a plurality of nettings are adhered to the surface of said porous cellulose hydrate body, said nettings having different scrubbing effects.

11. The material of claim 3, wherein said porous cellulose hydrate body further comprises plastic particles of 0.1 to 2 mm adhered to the surface thereof to improve scrubbing power.

12. A process for the manufacture of the porous material of claim 1, comprising the steps of:
   a. preparing a viscose mixture containing a pore-forming agent and said thermoplastic filler material;
   b. forming said viscose mixture into said porous cellulose hydrate body; and,
   c. bonding at least one netting to at least a portion of the surface of said body.

13. The process of claim 12, wherein said viscose mixture contains from about 3 to about 45% of said thermoplastic filler material.

14. The process of claim 13, wherein said thermoplastic filler material is a heat-sealable thermoplastic material, said netting is at least partially comprised of a heat-sealable material, and said bonding step comprises a heat-sealing step.

15. The process of claim 14, wherein said netting is bonded to said porous cellulose hydrate body by heat-sealing the periphery of said netting to said body.

16. The process of claim 14, further comprising thermally treating said porous cellulose hydrate body under pressure to improve its mechanical and cleaning properties.

* * * * *

UNITED STATES PATENT AND TRADEMARK OFFICE
CERTIFICATE OF CORRECTION

PATENT NO. : 4,130,683
DATED : December 19, 1978
INVENTOR(S) : Wolfgang Michel et al It is certified that error appears in the above-identified patent and that said Letters Patent are hereby corrected as shown below:

Page 1, kindly correct inventors name from "Kälberger" to
-- Kälberer --

Column 3, line 54, "pololefin" should read -- polyolefin --

Column 6, line 51 "thermplastic" should read -- thermoplastic --

Signed and Sealed this

Thirtieth Day of October 1979

[SEAL]

Attest:

RUTH C. MASON
Attesting Officer

LUTRELLE F. PARKER
Acting Commissioner of Patents and Trademarks